(12) United States Patent
Karbowski et al.

(10) Patent No.: US 8,272,237 B2
(45) Date of Patent: Sep. 25, 2012

(54) AUTOMATIC YARN-GRIPPING INSTALLATION

(75) Inventors: Jean-Pierre Karbowski, Saint-Thibaud de Couz (FR); Danyele Rey, legal representative, Chambery (FR); Natacha Karbowski, legal representative, Crest (FR); Marie Karbowski, legal representative, Hyeres (FR); Sarah Karbowski, legal representative, Saint-Alban-Leysse (FR); Lydia Karbowski, legal representative, Saint-Alban-Leysse (FR); Jean-Paul Boisset, Barby (FR); Frederic Skura, Clarafond (FR); Roger Bichat-Gobard, Saint-Pierre D'Entremont (FR)

(73) Assignee: OCV Intellectual Capital, LLC, Toledo, OH (US)

(*) Notice: Subject to any disclaimer, the term of this patent is extended or adjusted under 35 U.S.C. 154(b) by 1200 days.

(21) Appl. No.: 11/630,683

(22) PCT Filed: Jun. 27, 2005

(86) PCT No.: PCT/FR2005/050497
§ 371 (c)(1),
(2), (4) Date: Sep. 27, 2007

(87) PCT Pub. No.: WO2006/008408
PCT Pub. Date: Jan. 26, 2006

(65) Prior Publication Data
US 2010/0139326 A1    Jun. 10, 2010

(30) Foreign Application Priority Data

Jun. 28, 2004 (FR) .................................. 04 07063

(51) Int. Cl.
*C03B 37/02* (2006.01)
(52) U.S. Cl. .......................................................... 65/500
(58) Field of Classification Search .................... 65/381, 65/452, 453, 479, 480, 486, 533, 535, 536, 65/539
See application file for complete search history.

(56) References Cited

U.S. PATENT DOCUMENTS

| | | | | |
|---|---|---|---|---|
| 3,279,709 A | * | 10/1966 | Carlson et al. | 242/474.5 |
| 3,293,013 A | * | 12/1966 | Drummond | 65/475 |
| 3,681,039 A | * | 8/1972 | Marzocchi | 65/443 |
| 3,852,141 A | * | 12/1974 | Cross | 156/351 |

(Continued)

FOREIGN PATENT DOCUMENTS
EP    1910236    10/2011

OTHER PUBLICATIONS

Office action from Chinese Application No. 200580021634.4 dated Jul. 24, 2009.

(Continued)

*Primary Examiner* — Matthew Daniels
*Assistant Examiner* — Jodi C Franklin
(74) *Attorney, Agent, or Firm* — Calfee, Halter & Griswold LLP

(57) ABSTRACT

An automatic strand take-up installation includes at least a first gripping member for taking hold of at least one strand bundle, the first gripping member being guided by a first conveying loop to a second gripping member guided by a second conveying loop, the bundle passing from one loop to the other loop due to an operating system for opening and closing the gripping members.

14 Claims, 3 Drawing Sheets

U.S. PATENT DOCUMENTS

| | | | | | |
|---|---|---|---|---|---|
| 3,873,290 | A | * | 3/1975 | Marzocchi | 65/480 |
| 3,915,681 | A | * | 10/1975 | Ackley | 65/505 |
| 4,033,741 | A | * | 7/1977 | Drummond | 65/381 |
| 4,210,293 | A | * | 7/1980 | Fromaget | 242/474.5 |
| 4,222,758 | A | * | 9/1980 | Stotler et al. | 65/486 |
| 4,655,111 | A | * | 4/1987 | Blaker et al. | 83/356.3 |
| 5,935,289 | A | * | 8/1999 | Arterburn et al. | 65/471 |
| 5,970,837 | A | * | 10/1999 | Arterburn et al. | 83/552 |
| 6,845,696 | B2 | * | 1/2005 | Font et al. | 83/36 |
| 2004/0172978 | A1 | * | 9/2004 | Bumgarner et al. | 65/381 |
| 2005/0066688 | A1 | * | 3/2005 | Eis et al. | 65/381 |
| 2009/0193852 | A1 | * | 8/2009 | Boissonnat et al. | 65/480 |

OTHER PUBLICATIONS

Office action from Chinese Application No. 200580021634.4 dated Sep. 2, 2010.

Office action from Indian Application No. IN/PCT/2002/01518 dated Nov. 18, 2005.

Office action from Chinese Application No. 01812396.1 dated Jan. 27, 2006.

Office action from Chinese Application No. 200580034102.4 dated Apr. 10, 2009.

Office action from Chinese Application No. 200580034102.4 dated May 11, 2010.

Search Report and Written Opinion from FR 0755025 dated Dec. 21, 2007.

Office action from Slovakia Application No. PP 1823-2002 daed Apr. 25, 2006.

Office Action from Korean Application No. 10-2006-7027227 dated Mar. 6, 2012 with with English explanation of relevant portions of action.

Office action from Japanese Application No. 2008-522031 dated Mar. 27, 2012.

Office action from Korean Application No. 10-2007-7007843 dated May 30, 2012.

Office action from Mexican Application No. MX/a/2008/001000 dated Oct. 25, 2011 with with English explanation of relevant portions of action.

* cited by examiner

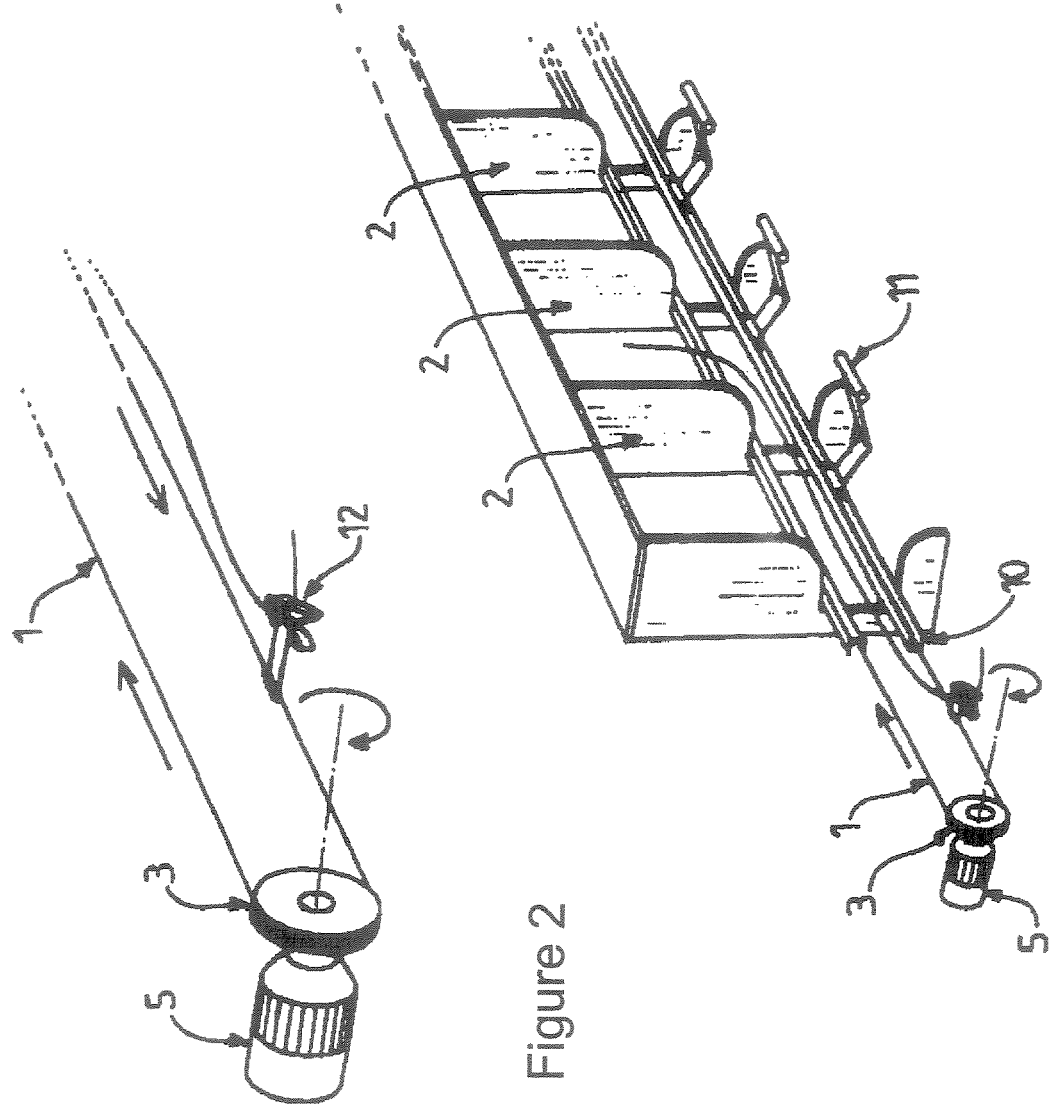

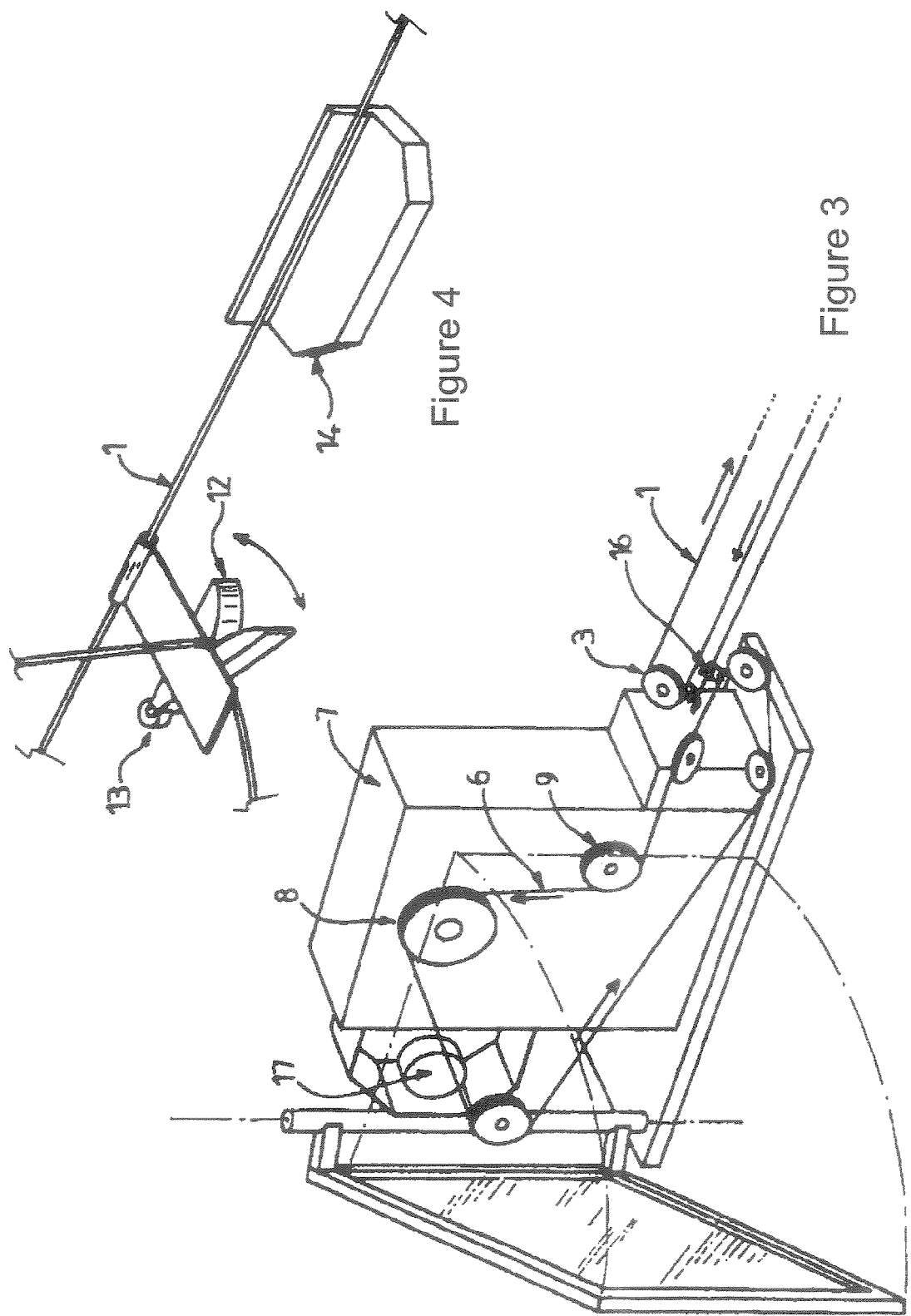

AUTOMATIC YARN-GRIPPING INSTALLATION

CROSS-REFERENCE TO RELATED APPLICATIONS

The present application is the U.S. counterpart of WO 2006/008408 and claims priority to French application no. 04/07063 filed on Jun. 28, 2004, the entire contents of each of which is hereby incorporated herein by reference.

BACKGROUND OF THE INVENTION

1. Field of the Invention

The present invention relates to an automatic strand take-up installation. Even more precisely it relates to a strand take-up installation intended to be used in a below-bushing chopping process, in which process thermoplastic strands, especially glass strands, are both drawn and chopped.

2. Discussion of the Background

It will be recalled that the manufacture of glass reinforcement strands results from a complex industrial process that consists in obtaining strands from molten glass streams that flow out through the orifices in bushings. These streams are drawn, from at least one fiberizing cabin, into the form of continuous filaments, these filaments are then gathered into base strands, and then these strands are for example chopped continuously so as to produce a plurality of chopped glass strands. This phase of the industrial process is commonly called "direct below-bushing chopping".

Conventionally, a fiberizing cabin essentially consists of a molten glass feed coming from a furnace, this glass at high temperature feeding a plurality of bushings made of a platinum alloy, which glass, after passing through orifices made in the bushing, creates filaments.

In a direct below-bushing chopping process, the filaments, after having received a sizing composition and having been combined into strands, are directed to a chopper which carries out both the drawing operation and the operation of chopping the strands into chopped glass strands.

Conventionally in an below-bushing chopping process, this operation is carried out by a bushing controller and takes place, during a normal production cycle, many times, as it is part of the technology and the operation of an below-bushing chopper.

The latter must draw the glass strands at a constant speed corresponding precisely to the steady-state output of the bushing. Now, to achieve this steady state, it is necessary to pass via a transient phase that consists essentially in progressively increasing the strand drawing speed. This transient phase is also present after any unexpected interruption to the production, such as for example when the strands break. It is necessary to pass via a transient restart phase that requires the strand to be drawn at a moderate speed, which can be obtained by hand or by an individual strand-puller placed beneath the sizing device for each bushing.

In principle, when the bushing operator judges that the bushing is thermally stabilized, he takes hold of the strand coming from the strand-puller for this bushing and directs it onto a restart member located after the chopping members, the restart member being designed to switch the strand drawing speed from a speed of the order of a few m/s (from 1 to 5 m/s) to a few tens of m/s, which in fact corresponds to the nominal drawing speed reached in the steady state.

When, this nominal speed is reached, the strands are directed onto the actual chopping member, generally consisting of an anvil wheel and a blade wheel, these being designed to output its chopped glass strands after the strands have passed between them.

Now, it will be understood that this back-and-forth movement between the bushing and the restart wheel of the chopper may take place according to programmed phases and according to non-programmed phases of the production cycle.

With regard to programmed phases, there are those that correspond to maintenance work, which requires the operation of the machine to be interrupted and the chopping member changed for example.

As regards non-programmed phases, these may especially involve work by the operator when the strand bundle breaks at any point between the bushing exit and the actual chopper.

Whatever the nature of the phases, the operator will have to move many times back and forth, which may take a not inconsiderable amount of time (especially when there are faults with several bushings). This results in a loss of final product (chopped glass strands) and the production of waste, and finally results in a reduction in efficiency of the production unit.

A direct below-bushing chopper installation for partly solving this problem is known, especially from patent U.S. Pat. No. 5,935,289. This installation is equipped with a mechanized device in the form of a shuttle that makes it possible, on the one hand, to take up at least one strand bundle and, on the other hand, to deposit the latter at the below-bushing chopper.

The major drawback of the above installation lies in its large size. This is because the mechanized device for taking up and depositing the strand bundle moves along a frame that faces the production installation, extending from vertically beneath the bushings as far as the actual chopper. This "curtain" arrangement constitutes a risk as regards work carried out by the bushing operator, the safety of the latter possibly being jeopardized by the unexpected passage of the shuttle.

SUMMARY OF THE INVENTION

The present invention therefore aims to alleviate these drawbacks by proposing a safe installation that makes it possible to limit the operator's back-and-forth movements between the plurality of juxtaposed fiberizing cabins and the chopper.

According to the invention, the automatic strand take-up installation intended to be used within an below-bushing chopping process, which consists in forming chopped glass strands directly from molten glass, said molten glass having passed through orifices made in at least one bushing so as to form a plurality of filaments, said filaments being combined into at least one bundle, said bundle being directed after a sizing operation to at least one chopper designed to chop at least one strand, formed by the combining of at least one bundle, into a plurality of chopped glass strands of desired length, and thus following a path between the bushing and the chopper, is characterized in that it comprises:

at least a first gripping member for taking hold of at least one strand bundle, said member being able to occupy a first position in which it takes hold of the strand bundle and a second position in which it releases the strand bundle;

a first conveying loop for moving the first gripping member between a first position, in which said first gripping member can take hold of at least one strand bundle, and a second position called the transfer position, in which said first gripping member releases said strand bundle;

at least a second gripping member for taking hold of at least one strand bundle, said member being able to occupy a first position in which it takes hold of the strand bundle and a second position in which it releases the strand bundle; and a second conveying loop for moving the second gripping member between a first position called the transfer position, in which said second gripping member takes hold of at least one strand bundle released by said first gripping member, and a second position in which said second gripping member releases said strand bundle at the chopper.

Thanks to these arrangements and especially to the presence of two conveying loops, it is possible to safely automate the travel of a strand bundle between a bushing exit and a chopper.

In preferred embodiments of the invention, one or more of the following arrangements may optionally also be employed:

the first conveying loop extends between two drive pulleys positioned respectively on either side of each of the ends of the plurality of juxtaposed cabins, and in a direction approximately perpendicular to a plane parallel to the path of said strand bundle;

the first conveying loop is set in motion by means of an actuator designed to make said first loop move continuously at a controlled speed;

the installation further includes at least one control member designed to modify the state of said first gripping member between the first and second positions;

the control member comprises at least one movable cam actuated by a lever, said cam being positioned in line with the strand bundle, said cam being provided with a guiding surface having an operating member fastened to said first gripping member;

the first gripping member can be decoupled from the first conveying loop;

the second conveying loop extends between at least two drive and guide pulleys which are positioned in such a way that, on the one hand, the second gripping member follows a path that intercepts that followed by the first gripping member and by a restart wheel of the chopper;

the second conveying loop is fastened to a structure articulated to the chopper, said structure being protected by at least one cover; and the first conveying loop undergoes a linear motion in a direction approximately parallel to and vertically below the juxtaposed bushings.

Other features and advantages of the invention will become apparent over the course of the following description of one of its embodiments, given by way of nonlimiting example, in conjunction with the appended drawings.

BRIEF DESCRIPTION OF THE DRAWINGS

In the drawings:

FIG. 1 is a schematic front view of the installation according to the invention;

FIG. 2 is a detailed view of one of the ends of a first conveying loop shown in FIG. 1;

FIG. 3 is a perspective view on a large scale of the gripping member with which the first conveying loop shown in FIG. 2 is equipped;

FIG. 4 is a perspective view of the chopper; and

DESCRIPTION OF PREFERRED EMBODIMENTS

Figure 5:
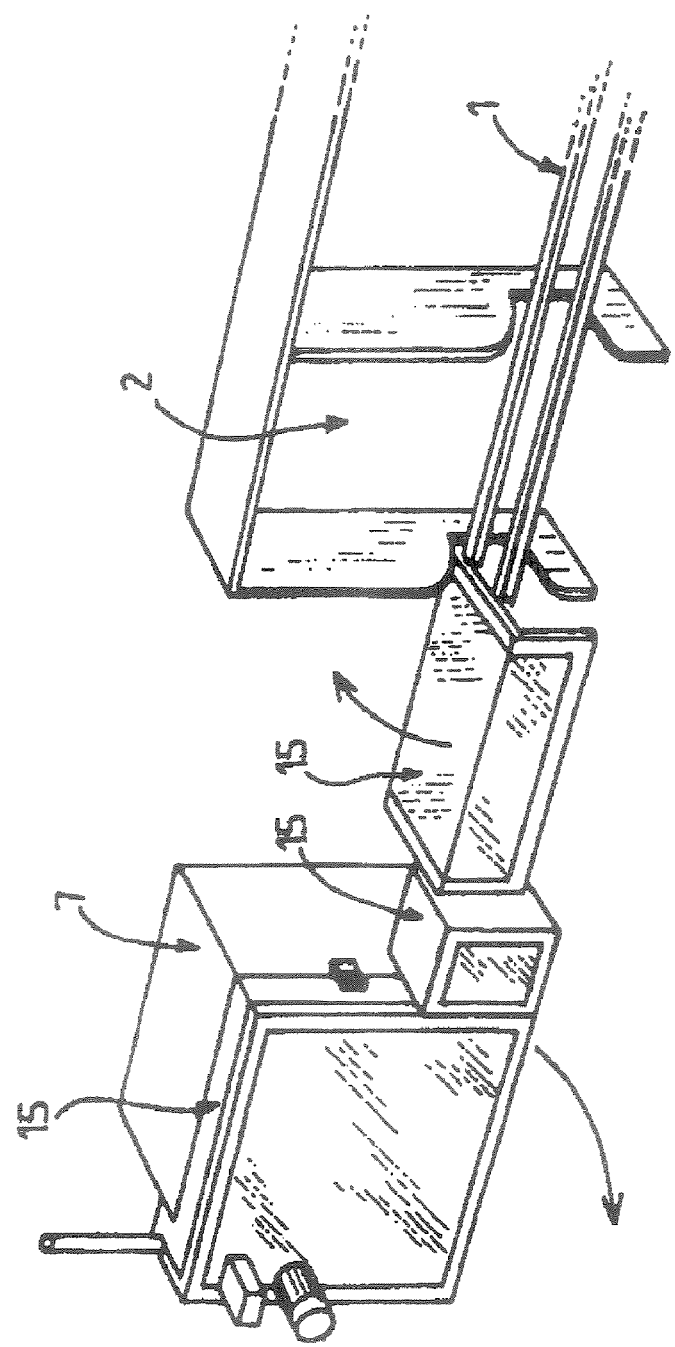
FIG. 5 is a detailed perspective view of the installation showing the protective covers.

FIG. 1 shows very schematically a production unit for implementing what is called a "direct below-bushing chopping" process. This process is well known to those skilled in the art and has formed the subject of many publications, especially EP 0 849 381 B1, and we will not describe its operation in further detail.

Overall, this production unit comprises a battery of juxtaposed bushings 2, each of these bushings being capable of producing glass filaments from molten glass, said molten glass having passed through orifices made in at least one of these bushings so as to form a plurality of filaments, said filaments being combined into at least one bundle, said bundle being directed after a sizing operation to at least one chopper, also shown in this figure, designed to chop at least one strand formed by the combining of at least one bundle into a plurality of chopped glass strands of desired length.

As also shown in FIGS. 1 and 2, a first conveying loop 1 is positioned vertically below the bushings 2 in a plane approximately parallel to the output of filaments coming from each of the bushings. This first conveying loop 1 is established between at least two pulleys 3, 4, at least one of which is motor-driven by an actuator 5, each of the pulleys being positioned respectively at each end of the battery of bushings 2.

The actuator 5 of the hydraulic or electric motor type, makes it possible, by means of a reduction gear, to set the conveying loop 1 into permanent motion with a controlled speed, which loop 1 has an approximately linear profile.

Likewise, a second conveying loop 6 is shown in FIG. 3, and extends approximately in a plane parallel to the front face of the chopper 7. This second conveying loop 6 has a sinuous profile so as to follow as closely as possible the front face of the chopper 7, this sinuous profile being obtained by positioning, at suitable places, a plurality of drive and guide pulleys 8, 9 which, in the case of some of them, form an angle return.

Similarly to the first conveying loop 1, the second conveying loop 6 is set in motion by means of an actuator (for example of the electric or hydraulic gearmotor type, not shown in this figure).

The first and second conveying loops 1, 6 visible in FIGS. 3 and 4 are produced using a metal cable, a smooth or cogged belt, a chain, a ram or any other device for producing an equivalent kinematic movement, that is to say one that makes it possible for a member supported by said loop to travel without slippage between two points.

In the nonlimiting example shown in FIG. 2, the conveying loops are formed from a metal cable, especially a steel cable, tensioned between two pulleys, at least one of which is motor-operated, the profile of the pulley groove being designed to limit, or even eliminate, any slippage with the peripheral surface of the cable (an approximately conical profile of this groove is particularly suitable).

FIGS. 4 and 5 show, on a larger scale, the front face of juxtaposed bushings visible in FIG. 1. The first conveying loop 1 is protected and guided inside a metal strip 10 of U-shaped cross section, these strips being installed within a recess made in the lower part of the bushing so as not to impede the passage of the glass filaments.

Positioned in each bushing well is an operating member 11 in the form of a pedal or lever (visible in FIG. 1), which makes it possible to operate a cam between a first position, in which in a first gripping member 12 cooperating with the first conveying loop 1 can take hold of a glass strand bundle, and a second position, in which this same gripping member passing near the bundle cannot take hold of it, as shown in greater detail in FIG. 4.

FIG. 4 shows in detail the first gripping member 12. This gripping member 12, in the form of pincers and having jaws with a curved profile so as to improve the guiding of the filaments, cooperates with the conveying loop 1 either in a permanent manner (clamping or pinching) or in a nonpermanent manner, and in this case it can be decoupled therefrom. The pincers are provided with a heel that supports a cam follower 13, thereby allowing the jaws of said pincers to open or close.

This opening or closing movement of the jaws is brought about by the cam follower 13 passing over guiding surfaces made on the edge of said cam 14 according to the following kinematics:

when the cam follower 13 is in contact with the inclined guiding surface, it opens the jaws; and when there is no longer any contact between the cam follower 13 and the guiding surface of the cam 14, which is parallel to the conveying loop, the jaws close around the filament bundle and entrain the latter owing to the translational movement of the conveying loop 1 that supports the gripping member 12.

This situation occurs only when the cam 14 is brought into position after the bushing operator has acted on the lever 11 (as was explained above).

FIG. 3 shows the path of the second conveying loop 6 at the front face of the below-bushing chopper 7. This path may be more sinuous than that formed by the first conveying loop, so as to better match the outline of the chopper. Thanks to the suitable positioning of the return and guide pulleys 8, 9, it is possible to incorporate this second conveying loop into an existing production installation. It should also be pointed out that this conveying loop 6 is protected by a plurality of covers 15 hinged to the frame of the chopper (see FIG. 5).

According to a preferred embodiment, the second conveying loop 6 is integral with a frame articulated to the frame of the chopper 7. This makes it possible to use the chopper in a conventional manner, that is to say without using the second conveying loop 6.

Mounted on the second conveying loop 6 is a second gripping member 16, the structure and the operation of which are similar to those of the first gripping member. Substantially in the form of pincers, the second gripping member can occupy two separate positions:

a first position in which it can take hold of the bundle taken up by the first gripping member 12; and a second position in which, on the contrary, it cannot take hold of the filament bundle conveyed by the first conveying loop 1.

For this purpose, provision is made for the first conveying loop 1 and the second conveying loop 6 to have, in the region where the strand bundle has to be transferred from one loop to the other, approximately parallel paths, as shown in FIG. 3, substantially in the bottom part of the chopper, so that the path described by the first gripping member 12 intercepts that of the second gripping member 16.

The second gripping member 16, thanks to the second conveying loop, conveys the strand bundle to a restart wheel 17 of the chopper 7.

It will be recalled that the restart wheel is the member that allows the strand bundles to be drawn during the transient operating phases of the chopper.

Specifically, when it is necessary to carry out a maintenance phase on the chopper (conventionally, a change of chopping members) or when a filament bundle has broken as a result of a malfunction of the bushing, it is necessary to remove the strands while continuing to draw them. The restart wheel participates in this process during these transient phases, by winding the strand bundle onto itself.

The restart wheel 17, shown in FIG. 3, is therefore provided with a device for automatically gripping the strand bundle conveyed by the second conveying loop at the second gripping member.

The restart wheel is positioned in such a way that the gripping device intercepts the path of the second gripping member.

In the illustrative example, the restart wheel is provided with a groove. This groove, when it crosses the path of the strand bundle, and under the effect of a rotational movement, engages the strand bundle and winds the strands onto the peripheral surface of the restart wheel.

In the event of the second gripping member not having pincers with controlled jaws, it would then be necessary to position a knife or any other similar member so that it can release the bundle from the second gripping member before the restart wheel is set in rotational movement.

The invention as described above affords many advantages:

the two conveying loops with their respective gripping member are positioned in regions of the production unit that are protected, thus ensuring the safety of the users; and this automatic strand take-up installation is compact and compatible with manual operation of the direct below-bushing chopping installation, the bushing operator being able, in the event of a problem, to feed the chopper manually.

The invention claimed is:

1. An automatic strand take-up installation configured to be used within a below-bushing chopping process, which forms chopped glass strands directly from molten glass, the molten glass having passed through orifices made in at least one bushing so as to form a plurality of filaments, the filaments being combined into at least one bundle, the bundle being directed after a sizing operation to at least one chopper configured to chop at least one strand, formed by combining of at least one bundle, into a plurality of chopped glass strands of desired length, and thus following a path between the bushing and the chopper, comprising:

at least a first gripping member for taking hold of at least one strand bundle, the first gripping member configured to occupy a first position in which it takes hold of the strand bundle and a second position in which it releases the strand bundle;

a first conveying loop for moving the first gripping member between a first position, in which the first gripping member can take hold of at least one strand bundle, and a second transfer position, in which the first gripping member releases the strand bundle;

at least a second gripping member for taking hold of at least one strand bundle, the second gripping member configured to occupy a first position in which it takes hold of the strand bundle and a second position in which it releases the strand bundle; and a second conveying loop for moving the second gripping member between a first transfer position, in which the second gripping member takes hold of at least one strand bundle released by the first gripping member, and a second position in which the second gripping member releases the strand bundle at the chopper;

wherein the second conveying loop is disposed adjacent to the chopper and arranged such that the chopper may operate either with or without the second conveying loop in operation.

2. The installation as claimed in claim 1, wherein the first conveying loop extends between two drive pulleys positioned respectively on either side of each of the ends of a plurality of adjacent bushings, and in a direction approximately perpendicular to a plane parallel to the path of the strand bundle.

3. The installation as claimed in claim 1, wherein the first conveying loop is set in motion by an actuator configured to make the first loop move continuously at a controlled speed.

4. The installation as claimed in claim 1, further comprising at least one control member configured to modify a state of the first gripping member between the first and second positions.

5. The installation as claimed in claim 1, wherein the second conveying loop is protected by at least one cover mounted so as to move relative to the chopper.

6. The installation as claimed in claim 1, wherein the second gripping member conveys the strand bundle to a restart wheel of the chopper via the second conveying loop.

7. The installation as claimed in claim 1, wherein the second conveying loop has a sinuous path that closely follows an external surface of the chopper.

8. The installation as claimed in claim 1, wherein the second conveying loop is integral with a frame articulated to a frame of the chopper.

9. An automatic strand take-up installation configured to be used within a below-bushing chopping process, which forms chopped glass strands directly from molten glass, the molten glass having passed through orifices made in at least one bushing so as to form a plurality of filaments, the filaments being combined into at least one bundle, the bundle being directed after a sizing operation to at least one chopper configured to chop at least one strand, formed by combining of at least one bundle, into a plurality of chopped glass strands of desired length, and thus following a path between the bushing and the chopper, comprising:

at least a first gripping member for taking hold of at least one strand bundle, the first gripping member configured to occupy a first position in which it takes hold of the strand bundle and a second position in which it releases the strand bundle;

a first conveying loop for moving the first gripping member between a first position, in which the first gripping member can take hold of at least one strand bundle, and a second transfer position, in which the first gripping member releases the strand bundle;

at least a second gripping member for taking hold of at least one strand bundle, the second gripping member configured to occupy a first position in which it takes hold of the strand bundle and a second position in which it releases the strand bundle;

a second conveying loop for moving the second gripping member between a first transfer position, in which the second gripping member takes hold of at least one strand bundle released by the first gripping member, and a second position in which the second gripping member releases the strand bundle at the chopper; and at least one control member configured to modify a state of the first gripping member between the first and second positions, wherein the control member comprises at least one movable cam actuated by a lever, the cam being positioned in line with the strand bundle, the cam including a guiding surface having an operating member fastened to the first gripping member.

10. The installation as claimed in claim 9, wherein the first gripping member is configured to be decoupled from the first conveying loop.

11. The installation as claimed in claim 9, wherein the first conveying loop undergoes a linear motion in a direction approximately parallel to and vertically below a plurality of adjacent bushings.

12. The installation as claimed in claim 9, wherein the first conveying loop is at least partially enclosed by a metal strip.

13. The installation as claimed in claim 12, wherein the metal strip has a U-shaped cross section.

14. The installation as claimed in claim 12, wherein the metal strip extends through a recess made in a lower part of each bushing.

* * * * *